United States Patent

Kawamura et al.

[11] Patent Number: 5,923,811
[45] Date of Patent: *Jul. 13, 1999

[54] APPARATUS AND METHOD FOR DECODING DATA

[75] Inventors: Makoto Kawamura; Yasushi Fujinami, both of Kanagawa, Japan

[73] Assignee: Sony Corporation, Tokyo, Japan

[*] Notice: This patent is subject to a terminal disclaimer.

[21] Appl. No.: 08/895,439

[22] Filed: Jul. 16, 1997

Related U.S. Application Data

[63] Continuation of application No. 08/573,516, Dec. 15, 1995, Pat. No. 5,719,982.

[30] Foreign Application Priority Data

Dec. 15, 1994 [JP] Japan .................................. 6-332918

[51] Int. Cl.$^6$ ...................................................... H04N 5/91
[52] U.S. Cl. ............................................... 386/65; 386/73
[58] Field of Search ................................. 386/65, 73, 60, 386/62, 95, 70, 125, 126, 46, 52, 69, 68; 360/13, 72.2; 369/47; H04N 5/91

[56] References Cited

U.S. PATENT DOCUMENTS 5,719,982  2/1998  Kawamura et al. ....................... 386/65

Primary Examiner—Robert Chevalier
Attorney, Agent, or Firm—Frommer Lawrence & Haug, LLP.; Willaim S. Frommer

[57] ABSTRACT

Data decoding suitable for a compressed moving picture, audio information, and so forth recorded on a disc or the like. A pack header and a packet header are separated from information reproduced with the video signal; and a time code is extracted from the header of a GOP (Group of Pictures). Successive time codes are added to those pictures (B pictures and P pictures) of the GOP to which time codes have not been assigned.

7 Claims, 22 Drawing Sheets

Fig. 4

STREAM_ID TABLE

| STREAM ID (BINARY) | STREAM TYPE |
|---|---|
| 1011 1100 | RESERVED STREAM |
| 1011 1101 | PRIVATE_STREAM_1 |
| 1011 1110 | PADDING STREAM |
| 1011 1111 | PRIVATE_STREAM_2 |
| 110X XXXX | AUDIO STREAM-NUMBER XXXX |
| 1110 XXXX | VIDEO STREAM-NUMBER XXXX |
| 1111 XXXX | RESERVED DATA STREAM-NUMBER XXXX |

Fig. 9

| ENTRY #0 | SECTOR ADDRESS OF ENTRY POINT #0 |
|---|---|
| #1 | SECTOR ADDRESS OF ENTRY POINT #1 |
| #2 | SECTOR ADDRESS OF ENTRY POINT #2 |
| #3 | SECTOR ADDRESS OF ENTRY POINT #3 |
| ⋮ | ⋮ |
| #N−2 | SECTOR ADDRESS OF ENTRY POINT #N-2 |
| #N−1 | SECTOR ADDRESS OF ENTRY POINT #N-1 |

Fig. 14

| PACKET START CODE PREFIX | ID | LENGTH | ****ID | ****PACKET TYPE | CURRENT* DATA STREAMS | CURRENT* VIDEO STREAMS | CURRENT* AUDIO STREAMS | -3 | -2 | -1 | +1 | +2 | +3 |

*Fig. 21*

| ENTRY #0 | SECTOR ADDRESS $TC_0$ OF ENTRY POINT #0 |
|---|---|
| #1 | SECTOR ADDRESS $TC_1$ OF ENTRY POINT #1 |
| #2 | SECTOR ADDRESS $TC_2$ OF ENTRY POINT #2 |
| #3 | SECTOR ADDRESS $TC_3$ OF ENTRY POINT #3 |
| #N-2 | SECTOR ADDRESS $TC_{N-2}$ OF ENTRY POINT #N-2 |
| #N-1 | SECTOR ADDRESS $TC_{N-1}$ OF ENTRY POINT #N-1 |

APPARATUS AND METHOD FOR DECODING DATA

This application is a continuation of application Ser. No. 08/573,516, filed Dec. 15, 1995 (now U.S. Pat. No. 5,719,982).

BACKGROUND OF THE INVENTION

The present invention relates to a data decoding apparatus and method for reproducing compressed moving picture and audio data recorded on a disc using a time-division multiplexing format.

One encoding and decoding technique encodes compressed moving picture and audio data into one multiplexed bit stream format according to ISO 11172 (MPEG), composed of at least one pack and one 32-bit ISO_11172_end code defined as 0x000001b9 in a hexadecimal notation, as shown in FIG. 3. Although the length of the pack is shown as being fixed (2048 bytes), the length can vary with the number of packets in a pack. A pack includes at least one packet and a pack header comprising a 32-bit Pack_Start_Code (0x000001b4), a System Clock Reference (SCR), and a MUX rate indicator. A packet includes packet data (Code Data) and a packet header, containing a 24-bit Packet_Start_Code_Prefix (0x000001) an 8-bit Stream_ID code as shown in FIG. 4, a 16-bit Packet_Length indicator representing the length of the packet data, and a Presentation Time Stamp (PTS). The actual audio or video data is recorded in the Code Data field of each packet corresponding to an audio or video stream.

The audio stream has thirty-two unique Stream IDs and the video stream has sixteen unique stream IDs. Consequently, a total of thirty-two types of audio signals and sixteen types of video signals can be multiplexed. Depending on the Stream ID shown in FIG. 4, data is recorded to private_stream_1 or private_stream_2, depending on the application. The reserved stream presently is not used, and the padding_stream is used to increase the data amount.

FIG. 1 shows an example of encoding apparatus for encoding and recording a compressed moving picture and audio data on a disc using a time-division multiplexing format in accordance with the aforementioned technique. In FIG. 1, a video signal is compressed and encoded by a video encoder 1. The compressed and encoded signal is supplied to a code buffer 4 of a multiplexing unit 13. In addition, an audio signal is compressed and encoded by an audio encoder 2. The compressed and encoded audio signal is supplied to a code buffer 5 of the multiplexing unit 13.

Output terminals of the code buffers 4 and 5 are connected to the input terminals E1 and E2, respectively, of a switching circuit 6. The output terminal F of the switching circuit 6 is connected to the input terminal of a header adding circuit 7. The result of the header adding circuit 7 is stored in the DSM (digital storage medium) 10, which can be a magneto-optic disc, a magnetic disc (hard disc), or other similar storage device.

A controlling unit 8 receives system clock information from a multiplexing system clock generating circuit 9 and alternately connects the input terminals E1 and E2 of the switching circuit 6 to the output terminal F at predetermined intervals so as to perform the time division multiplexing process on the data from the code buffers 4 and 5.

The controlling unit 8 performs a header adding process and a code reading process corresponding to the algorithm (flow chart) in FIG. 5 so that a bit stream containing 2048-byte packs is generated corresponding to the format shown in FIG. 3.

At step S1, the header adding circuit 7 adds a pack header under the control of the controlling unit 8. At step S2, the controlling unit 8 waits until the sum of M4 and M5 is equal to or exceeds D, where M4 and M5 represent the amount of data written to the code buffers 4 and 5, respectively, and D represents the maximum amount of data allowed in one pack. The controlling unit 8 waits until one packful of data is stored in the code buffers 4 and 5. For simplicity, D is a constant and equal to the pack length (2048 Bytes) minus the pack header length, the video packet header length, and the audio packet header length.

At step S3, P1 bytes of video data and P2 bytes of audio data to be placed in a pack are calculated corresponding to the following equations:

$$P1 = D \times [M4/(M4+M5)]$$

$$P2 = D - P1$$

The total amount of audio and video code data included in a pack depends on the ratio of the data contained in the code buffers 4 and 5. After the data amount is determined, the header adding circuit 7 outputs a video packet header at step S4 and P1 bytes of video data is read from the code buffer 4 and supplied to the DSM 10 at step S5. Likewise, an audio packet header is added at step S6 and P2 bytes of audio data is read from the code buffer 5 and supplied to the DSM 10 at step S7.

FIG. 2 shows an example of decoding apparatus for decoding data recorded on a disc by the apparatus shown in FIG. 1. A header separating circuit 22 of a separating unit 21 separates a pack header and a packet header from the multiplexed data read from the DSM 10 and supplies the reproduced pack and packet headers to a controlling unit 24. In addition, the time-division multiplexed data is supplied to the input terminal G of a switching circuit 23. The output terminals H1 and H2 of the switching circuit 23 are connected to the input terminals of a video decoder 25 and an audio decoder 26, respectively.

The controlling unit 24 of the separating unit 21 alternately connects the input terminal G of the switching circuit 23 to the output terminals H1 and H2 depending on the Stream ID of the packet header supplied by the header separating circuit 22 to correctly demultiplex the time-division multiplexed data, and to supply the demultiplexed data to the respective decoders.

When the multiplexed video data has been compressed corresponding to the MPEG encoding method, a random access operation and a search operation of the compressed data are restricted. The following types of pictures are used in the MPEG encoding method: intra-frame encoded (I) pictures, inter-frame predictive encoded (P) pictures, and inter-frame bi-directionally predictive encoded (B) pictures.

Since an I picture is encoded using only its own data (an information contained in its frame or its field), data compression efficiency suffers as a result, but no additional information is needed to decode an I picture. P and B pictures are encoded using the difference between two pictures; which effectively increases the compression efficiency. Since a P picture is encoded using motion compensated prediction from two preceding pictures, the predicted picture data of two preceding pictures is required before the P picture can be decoded. Since a B picture is encoded using motion compensated prediction from one preceding picture and one succeeding picture, the predicted picture data of such preceding and succeeding pictures is required before the B picture can be decoded. To accomplish this, approximately two I pictures are generated per predetermined time interval to balance the random access characteristic and compression efficiency.

FIG. 6 is a schematic diagram showing a bit stream including the I pictures, the P pictures, and the B pictures recorded on a disc of the DSM 10. The video bit stream is divided into GOPs (Group of Pictures), each of which is composed of a header and a plurality of picture data. The header is composed of a Group-Start-Code (GSC), a Time-Code (TC), a Closed GOP (CG), and a Broken-Link (BC). In the video bit stream, the first picture data in a GOP is an I picture.

When the video data is compressed at a fixed rate, the position of the desired I picture can be easily calculated and accessed because I pictures are periodically disposed at predetermined positions. However, when the video data is compressed at a variable rate, it is difficult to access the I pictures because the positions of the I pictures are no longer fixed.

When a search command is issued to the multiplexed data decoding apparatus shown in FIG. 2 to reproduce I pictures, the main controlling unit (not shown) causes the controlling unit 24, the video decoder 25, and the audio decoder 26 to enter the search mode. The video decoder 25 decodes only the picture data bits representing the I pictures. Alternatively, the separating unit 21 selects only the picture data representing the I pictures and supplies it to the video decoder 25. The controlling unit 24 issues commands to the DSM 10 for moving the data read position of the disc in the forward or reverse directions.

Although the displacement of the read position depends on various factors, it is generally proportional to the search speed and the data encoding rate. When the read position of the disc is moved to a predetermined position, the DSM 10 supplies the data recorded in that position to the separating unit 21. The header separating circuit 22 of the separating unit 21 separates the video data from the reproduced data and supplies the video data to the video decoder 25. The video decoder 25 decodes and outputs only the video data representing I pictures. In the search mode, the audio decoder 26 is placed in the mute state (disabled).

When a user issues a high speed forward search command, the video decoder 25 searches for an I picture after skipping a predetermined number of frames or alternatively, the DSM 10 searches for an I picture and supplies the data representing an I picture to the video decoder 25. When an I picture is detected or supplied, the video decoder 25 decodes the data and outputs the decoded data. By repeating these steps, successive reproduction of the I pictures is accomplished.

FIG. 7 shows another example of encoding apparatus. In FIG. 7, an input video signal and an input audio signal are supplied to a video encoder 1 and an audio encoder 2, respectively. The compressed and encoded video and audio data are then supplied to the multiplexing unit 13.

The multiplexing unit 13 multiplexes the input video data and the input audio data on a time division basis and supplies the multiplexed data to the DSM 10 which stores the multiplexed data.

An output terminal of the video encoder 1 is also connected to an input terminal of a video entry point detecting circuit 31. An entry point data storing circuit 33A receives and stores an entry point signal that is generated when an I picture is detected in the input video data by the video encoder 1 or that is generated by the video entry point detecting circuit 31. The video encoder 1 generates the entry point signal instead of the video entry point detecting circuit 31 when an I picture is detected unless either the video encoder does not have the capability of generating an entry point signal or an encoded video bit stream includes an entry point signal that has already been multiplexed therein.

After the video signal and the audio signal are encoded and multiplexed, the multiplexed bit stream is written to the DSM 10. In addition, entry point information necessary for structuring a table of contents (TOC) is stored in the entry point data storing circuit 33A. Thereafter, a TOC adding process is initiated. Entry point information is supplied from the entry point data storing circuit 33A, as may be selected by a user (not shown) or a controller (not shown), to a TOC data generating circuit 56. Normally, only an entry point at the beginning of a track is selected. The entry point data supplied to the TOC data generating unit 56 is converted to conform to the format shown in FIG. 9, where it is assumed there are N entry points and each entry point is represented by a four-byte sector address.

The TOC data generating circuit 56 supplies formatted TOC data to a TOC adding circuit 50 which adds the TOC information to the beginning of the multiplexed data (referred to as the top sector) supplied by the DSM 10 before outputting the multiplexed data to a sector header adding circuit 51. The sector header adding circuit divides the input data into 2048-byte sectors to which a 16-byte sector header is added. As shown in FIG. 10, the first 4-bytes of the sector header contain the sector number information.

An output signal of the sector header adding circuit 51 is supplied to an ECC encoder 52 which adds a predetermined amount of redundant data (parity) to the input data supplied thereto and couples the resultant ECC-encoded data to a modulating circuit 53. The modulating circuit modulates the ECC-encoded data and supplies the modulated data to a cutting machine 54, which writes the modulated data to an optical disc 60.

FIG. 8 shows another example of decoding apparatus. When the optical disc 60 is inserted into the decoding apparatus, a controller 67 transmits a top sector reading command to the drive controlling unit 69, which causes a tracking servo circuit 70 to drive a pickup 61 and commence reproducing data from disc 60 at the position identified by the top sector.

The pickup 61 radiates a laser beam to the optical disc 60 and reproduces data recorded on the optical disc corresponding to the reflected beam. A reproduced signal supplied from the pickup 61 is supplied to a demodulating circuit 62 which demodulates the input signal. The demodulated data sequence is supplied to an ECC circuit 63, which detects and corrects errors and supplies the error-corrected data to a demultiplexing circuit 64.

The demultiplexing circuit 64 separates and supplies the TOC information recorded in the top sector to the controller 67. Responsive to the controller 67, a TOC storing unit 68 stores the TOC information and a display unit (not shown) displays the TOC information to the user (not shown). Also under the control of the controller, and responsive to a "start" command from the user, the drive controlling unit 69 starts the commanded operation. The tracking servo circuit 70 drives the pickup 61 to reproduce data from a position designated by the user. In addition, a video decoder 65 and an audio decoder 66 receive commands from the controller 67 to initiate the video and audio decoding process.

Demultiplexing circuit 64 separates the TOC information and also separates the reproduced data into video and audio data which are supplied to the video decoder 65 and to the audio decoder 66, respectively.

As previously described in connection with the decoding apparatus shown in FIG. 1, it is difficult to access the I pictures when a video bit stream is compressed at a variable rate because the positions of the I pictures become uncertain. This is shown in FIG. 6.

When the data decoding apparatus shown in FIG. 8 receives a search command, the drive controlling unit 69, the video decoder 65, and the audio decoder 66 enter the search mode in response to a suitable command from the controller 67. In the search mode, the video decoder 66 decodes only that portion of the input video data representing the I pictures or alternatively, the demultiplexing circuit 64 selects and supplies only data representing the I pictures to the video decoder.

Although the displacement of the read position of disc 60 depends on various factors, it is generally proportional to the search speed and the encoding rate. When the read position is moved to a predetermined position, the pickup 61 supplies the data recorded in that position to the demultiplexing circuit 64 through the demodulating circuit 62 and the ECC circuit 63. The demultiplexing circuit 64 separates the video data from the reproduced data and supplies the video data to the video decoder 65, which decodes and outputs only the video data representing the I pictures. In the search mode, the audio decoder 66 is placed in the mute state (disabled).

Thus, the search operation (successive reproduction of I pictures) is accomplished by repeating the foregoing random access operation but in order. When a user issues a high speed forward search command, the video decoder 65 searches for an I picture after skipping a predetermined number of frames or alternatively, the tracking servo circuity 70 searches for an I picture and supplies the data representing an I picture to the video decoder 65. When an I picture is detected or supplied, the video decoder 65 decodes the data and outputs the decoded data. By repeating these steps, successive reproduction of the I pictures is accomplished.

A portion of the I picture position data is stored in the TOC storing unit 68; for example, only the position data of the I pictures which commence at the beginning of individual tracks are stored. The position data of all the I pictures generally are not stored in the TOC storing unit 68 due to its capacity limitations. Assuming that two I pictures are generated per second, then 7,200 I pictures for a one hour video program are recorded on the recording medium.

One example of entry packet technology is described in U.S. patent application Ser. No. 08/432,145 filed on Sep. 21, 1994 and corresponding European Laid-Open Publication 0,676,756, published Oct. 11, 1995, the data encoding and decoding apparatus thereof being re-presented herein in FIGS. 11 and 12 which use the same reference numerals as were used in FIGS. 1, 2, 6 and 7.

In accordance with ISO 11172, the encoding apparatus shown in FIG. 11 accepts as an input a multiplexed bit stream that is composed of at least one pack and ISO_11172_end_code. An example of a pack structure is shown in FIG. 13, where a Pack_Header is followed by a Video_Packet_Header and packets of video data that do not include I pictures. The video data is followed by an Entry_Packet, a Video_Packet_Header, and packets of video data that include I pictures.

The format of the Entry_Packet is shown in FIG. 14, which accords with the format of a private_stream_2 packet of the MPEG packets such as those identified in FIG. 4. Similar to the packet header structure in FIG. 3, at the beginning of each Entry_Packet, there are disposed a Packet_Start_Code_Prefix followed by a Stream_ID (0×bf in hexadecimal notation) and length information that represents the length of the rest of the packet. In the example shown in FIG. 14, length information is followed by **_id, which represents that the private packet is a unique format of a particular person (), followed by **_packet_type which represents the type of the private packet format of that particular person.

In the case of an entry packet, **_packet_type is 0×ff. **_packet_type is followed by a current_*_data_streams representation, a current_*_video_streams representation, and a current_*_audio_streams representation, which respectively represent the number of data packets, the number of video packets, and the number of audio packets that have been multiplexed between this entry packet and the next entry packet. The current_*_audio_streams representation is followed by entry packet position data, including an entry_packet_-3, an entry_packet_-2, an entry_packet_-1, an entry_packet_+1, an entry_packet_+2, and an entry_packet_+3.

FIG. 11 shows an example of the encoding apparatus using the entry packet technology having the format shown in FIGS. 13 and 14. In FIG. 11, the output terminal of the video encoder 1 is connected to the input terminal of a video entry point detecting circuit 31, which output is connected to the input terminal of the code buffer 4.

An entry packet generating circuit 32 receives a control input signal from the controlling unit 8 to supply entry packet data to input terminal E3 of the switching circuit 6. The controlling unit 8 receives system clock information from the multiplexing system clock generating circuit 9 and alternately connects the input terminals E1, E2, and E3 of the switching circuit 6 to the output terminal F for predetermined intervals. Also, although not shown, the controlling unit extracts data from the code buffer 4, the code buffer 5, or the entry packet generating circuit 32, multiplexes such data, and supplies the multiplexed data to the header adding circuit 7.

The controlling unit 8 receives an entry point signal generated by encoder 1 when an I picture is detected in the input video data by the video encoder or by the video entry point detecting circuit 31 which detects entry point data in the video data. The controlling unit inserts an entry packet into a predetermined position in the bit stream in response to the entry point signal. In FIG. 13, an entry packet is inserted into a position just preceding the video entry point. The video encoder 1 generates the entry point signal instead of the video entry point detecting circuit 31 when an I picture is detected, unless either the video encoder 1 does not have the capability of generating an entry point signal or the encoded video bit stream already includes an entry point signal that has been multiplexed therein. An entry point storing unit 33 stores the position data of the detected entry point.

When the controlling unit 8 receives the entry point signal, it causes the entry packet generating circuit 32 to generate an entry packet and the switching circuit 6 to switch to the input terminal E3. The entry packet is supplied to the header adding circuit 7 and the entry packet is multiplexed with the video data and audio data supplied from the code buffers 4 and 5, respectively.

As shown in FIG. 14, the relative positions of three preceding and three succeeding entry packets for each entry packet are recorded in the disc sector selected by the driving unit of the DSM 10 in the following respective fields: entry_packet_-3, entry_packet_-2, entry_packet_-1, entry_packet_+1, entry_packet_+2, and entry_packet_+3. Since three preceding entry packet positions had been stored in the entry point storing unit 33 by the time the current entry packet is recorded, these prior positions can be easily obtained. Also, these preceding entry positions can be supplied to the DSM 10 so they can be recorded on a disc.

However, three succeeding (future) entry packet positions are unavailable and cannot be detected at the current time. Thus, the controlling unit 8 causes the entry point storing unit 33 to store the positions of the respective entry points as they are produced so they can be inserted later. After all data has been multiplexed (namely the bit stream of video data and audio data has been recorded on a disc), the three preceding and three succeeding entry packet positions relative to each entry packet are read from the entry point storing unit 33 and supplied to the DSM 10. Thus, these entry packet positions are recorded to individual entry packets on the disc.

The video encoder 1 and the audio encoder 2 encode the video signal and the audio signal respectively at variable rates. The controlling unit 8 controls the header adding circuit 7 to add pack headers so that the length of each pack is 2048 bytes. To do that, the controlling unit 8 controls the header adding process, the code reading process, and the entry packet inserting process corresponding to the algorithm (flow chart) shown in FIG. 15.

As with the process shown in FIG. 5, it is assumed that M4 and M5 represent the amount of data stored in the code buffers 4 and 5, respectively. D represents the maximum amount of code data allowed in one pack. For simplicity, D is a constant and equal to the pack length (2048 Bytes) minus the lengths of the pack header, the video packet header, and the audio packet header. If a pack contains entry packets, then D no longer represents the total amount of code data in a pack. Thus, the total length of the entry packets must be subtracted from D when a pack includes entry packets to obtain the total amount of code data in that pack (D2).

At step S11, the controlling unit 8 causes the header adding circuit 7 to add a pack header. At step S12, the controlling unit 8 waits until the sum of M4 and M5 is equal to or exceeds D. That is, the controlling unit 8 waits until one packful of data is stored in the code buffers 4 and 5. Next, at step S13, P1 bytes of video data and P2 bytes of audio data to be placed in a pack are calculated by the following equations:

$$P1=D\times[M4/(M4+M5)]$$

$$P2=D-P1$$

The total amount of audio and video code data included in a pack depends on the ratio of the data contained in the code buffers 4 and 5. At step S14, the controlling unit 8 determines whether or not P1 bytes of video data in the pack include a video entry point. When the pack does not include a video entry point, the controlling unit 8 causes the header adding circuit 7 to output the video packet header at step S15. Next, P1 bytes of video data are read from the code buffer 4 and supplied to the DSM 10 at step S16. In addition, the controlling unit 8 causes the header adding circuit 7 to output the audio packet header at step S17. Then, P2 bytes of audio data are read from the code buffer 5 and supplied to the DSM 10 at step S18, similar to the process shown in FIG. 5.

When the pack includes a video entry point, inquiry S14 is answered in the affirmative and step S19 is carried out such that the controlling unit 8 causes the entry point storing unit 33 to store the position of the current pack and to calculate the amount of video data P1 and the amount of audio data P2 stored in the pack corresponding to the following equations:

$$P1=D2\times[M4/(M4+M5)]$$

$$P2=D2-P1$$

These arithmetic operations in step S19 are similar to the arithmetic operations performed at step S13, except the element D is replaced with D2. D2 is obtained by subtracting the length of the entry packets from D and represents the total amount of code data in a pack.

Next, the video packet header is supplied from the header adding circuit 7 to the DSM 10 at step S20. Thereafter, the video data that just precedes the video entry point is supplied to the DSM 10 through the video encoder 1, the video entry point detecting circuit 31, the code buffer 4, the switching circuit 6, and the header adding circuit 7. At step S21, the video data is stored on the disc. Next, the entry packet generating circuit 32 generates the entry packet that is recorded on the disc at step S22. (At this time, the relative position information of the entry packet is not written to the disc).

Thereafter, at step S23, the video packet header is produced by controlling unit 8 and recorded once again. At step S24, the rest of the video data is outputted and recorded. Next, the controlling unit 8 processes the audio data. The audio packet header is added at step S17 and P2 bytes of audio data is recorded at step S18.

Thereafter, the algorithm shown in FIG. 15 is repeated. The position data is written to the video and audio encoders 1 and 2 and the controlling unit 8 reads from the entry point storing unit 33 the position of the pack that includes the entry packet and writes the entry packet position, including three preceding and three succeeding entry packet positions, to each respective entry packet recorded on the disc of the DSM 10.

FIG. 12 shows an example of the decoding apparatus compatible with the encoder shown in FIG. 11. A header separating circuit 22 of a separating unit 21 separates a pack header, a packet header, and an entry packet from data read from the DSM 10 and supplies the separated headers to the controlling unit 24. In addition, the header separating circuit 22 supplies to the input terminal G of the switching circuit 23 data that has been time-division multiplexed. The output terminals H1 and H2 of the switching circuit 23 are connected to the video and audio decoders 25 and 26, respectively.

The controlling unit 24 reads the entry point information (entry packet information) from the output data separated by the header separating circuit 22 and supplies this information to an entry point storing unit 41 which stores the entry point information (entry packet information). Since the DSM 10 supplies the information contained in the current read position to the controlling unit 24, the controlling unit correlates this information with the positions of the entry points and causes the entry point storing unit 41 to store the resultant data.

The controlling unit 24 of the separating unit 21 alternately connects the input terminal G of the switching circuit 23 to the output terminals H1 and H2 in response to the Stream ID of the packet header supplied by the header separating circuit 22. Also, the controlling unit 24 controls the demultiplexing of the time-division multiplexed data which are supplied as video data to the video decoder 25 and the audio data to the audio decoder 26, respectively.

When a search command is issued by the user, the main controlling unit (not shown) causes the controlling unit 24, the video decoder 25, and the audio decoder 26 to enter the search mode. The DSM 10 supplies the current read position to the controlling unit 24. The entry point storing unit 41 stores the information of the entry packets reproduced during a reproduction mode; and this information of the entry points in the vicinity of the preset read position are extracted from the entry point storing unit. Alternatively, at a predetermined time (namely, when power for the apparatus is turned on, the disc is inserted, or the reproduction command is issued), information of the entry packets in a predetermined range may be pre-read and pre-stored.

When an entry point is selected, the controlling unit 24 sends a search command to the DSM 10 which quickly moves the read position to the entry point and supplies the reproduced data to the separating unit 21.

As described above (see FIG. 13), an entry packet is followed by the video data of an I picture. When the video data that just follows the entry packet is separated by the header separating circuit 22 and supplied to the video decoder 25, that video data represents an I picture. The video decoder decodes the I picture located at the beginning of the video data and outputs the decoded signal. In the search mode, the audio decoder 26 is in the mute state (disabled).

Since an entry packet contains position information of three preceding and three succeeding entry points, the controlling unit 24 performs a search operation for the next entry point and repeats the aforementioned reproduction operation, thereby enabling the apparatus to quickly and successively reproduce I pictures.

When the search speed is high, the controlling unit 24 causes the DSM 10 to access the furthest entry point. On the other hand, when the search speed is low, the controlling unit 24 causes the DSM 10 to access the nearest entry point. Since three preceding and three succeeding entry points have been recorded, searching in three or more levels can be used as a combination of selected entry points.

Thus, the search operation can be easily performed because the positions of I pictures (access points) correspond to the entry point data contained in the entry packets.

In addition to the search operation in which the user scans through the pictures displayed on the screen, a second search operation uses the designated start time of a program to search for the desired picture. In this search operation, for example, the start time of a program on a disc and a search point can be designated as "0 hour, 0 minute, 0 second, 0 frame" and "0 hour, 5 minutes, 10 seconds, 12 frames", respectively.

In a professional VCR, for example as may be used in a conventional broadcasting station, the time codes are written in individual frames, for example, using the blanking regions of a video tape. Since the time codes can be precisely obtained for each frame, the search operation can be accurately performed using these time codes. However, since the time codes must be written in each individual frame, the recording capacity of the tape must be sufficient to record the video data plus all the time codes.

In a home-use VCR, all the time codes normally are not written on the tape because of the limited recording capacity thereof. Instead of actual time codes, pseudo time codes are generated by counting control pulses (CTLS) to calculate the reproduction (record) time of a program. Thus, this method displays relative and not actual times. Also, this method is less reliable and more susceptible to errors, such as drop-out, because the time codes are not written in each individual frame.

On the other hand, time codes are written in a bit stream in the MPEG-2 video standard. In ISO/IEC 13818-2, 25-bit time codes are defined and written to a group of pictures (GOP) header. But, the time codes are not written in individual pictures because the time codes or their equivalents are not defined and included in a picture header.

Since the length of the GOP is not fixed in MPEG, the 25-bit time code contained in the GOP header corresponds to only the picture represented by the first frame of the GOP. Consequently, no times codes are designated to pictures following the first frame. It is difficult to generate the time codes for each individual frame in the GOP when the data stream is compressed at a variable rate because positions of the pictures become uncertain. Thus, even if the time codes of individual GOPs are detected so that they correspond to the entry packets, as discussed above, the time codes can be generated intermittently only.

OBJECTS AND SUMMARY OF THE INVENTION

Therefore, an object of the present invention is to provide data decoding apparatus for obtaining intermittent time codes, displaying the time codes for individual frames, and searching programs corresponding to the time codes.

Another object of the present invention is to provide data decoding apparatus for extracting time codes from a GOP header designated by an entry pointer and interpolating successive time codes from the times codes separated from the GOP header.

Yet another object of the present invention is to provide data decoding apparatus for interpolating successive time codes using a counter where either the time codes separated from the GOP header or a picture start code is accepted as an input.

A further object of the present invention is to provide data decoding apparatus for designating the time codes for frame, for comparing the time codes, and accessing the data corresponding to the compared result.

In accordance with an aspect of this invention, data decoding apparatus decodes a data bit stream which includes picture data bits representing pictures and into which time codes have been intermittently inserted with respect to predetermined pictures. The inserted time codes are extracted from the data bit stream and successive time codes are interpolated for those pictures in the data bit stream to which the time code has not been inserted. The successive time codes are displayed.

The above, and other objects, features and advantages of the present invention will be apparent from the following detailed description of preferred embodiments when read in conjunction with the accompanying drawings in which corresponding parts are identified by the same reference numerals.

BRIEF DESCRIPTION OF THE INVENTION

FIG. 4 is a table explaining a stream ID;

FIG. 9 is a schematic diagram explaining the structure of TOC data;

FIG. 14 is a schematic diagram explaining the format of an entry packet;

FIG. 21 is a table showing an example of TOC used with data decoding apparatus according to the present invention;

DETAILED DESCRIPTION OF PREFERRED EMBODIMENTS

Figure 1:
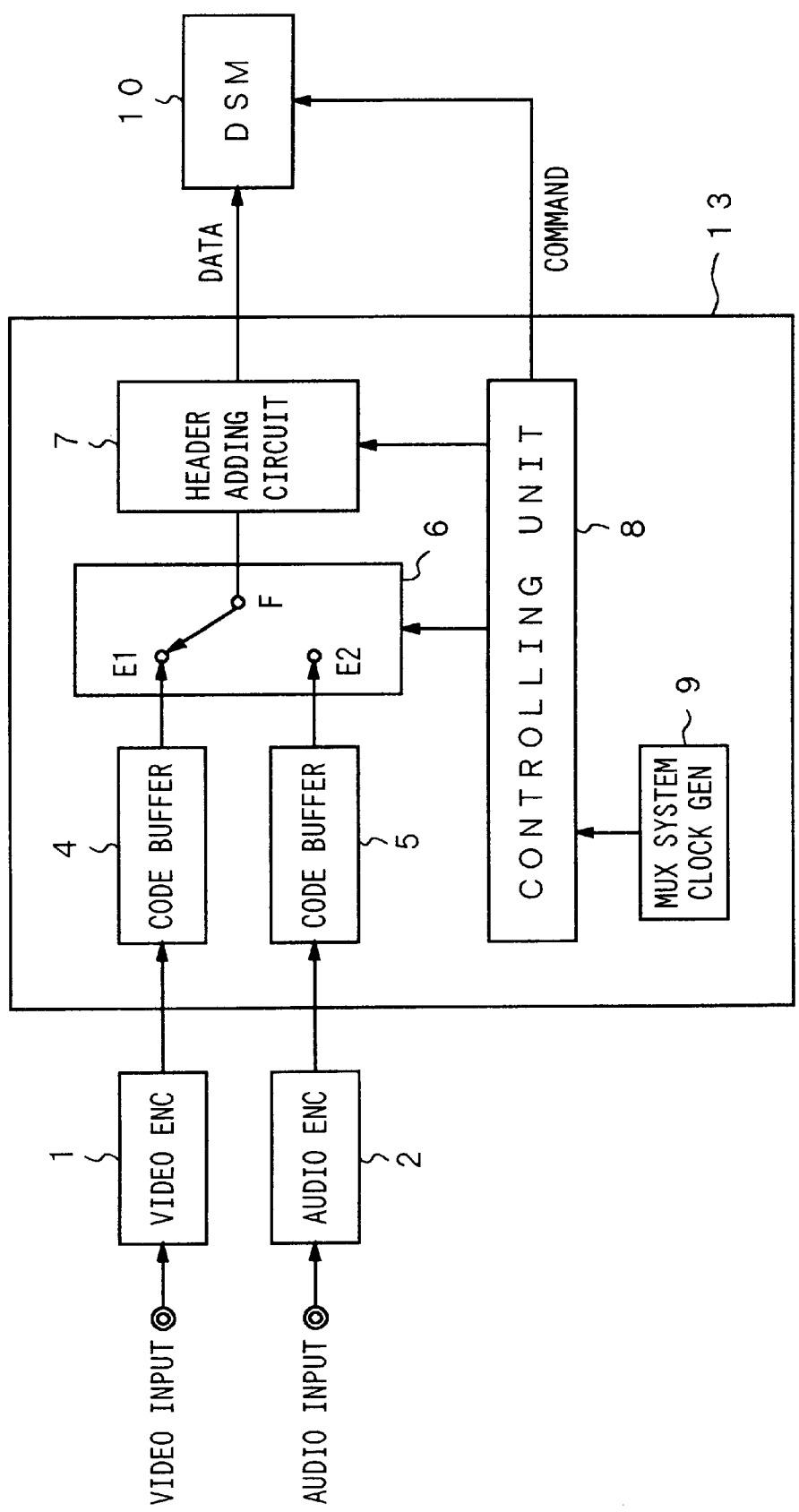
FIG. 1 is a block diagram showing an example of data encoding apparatus.
Figure 2:
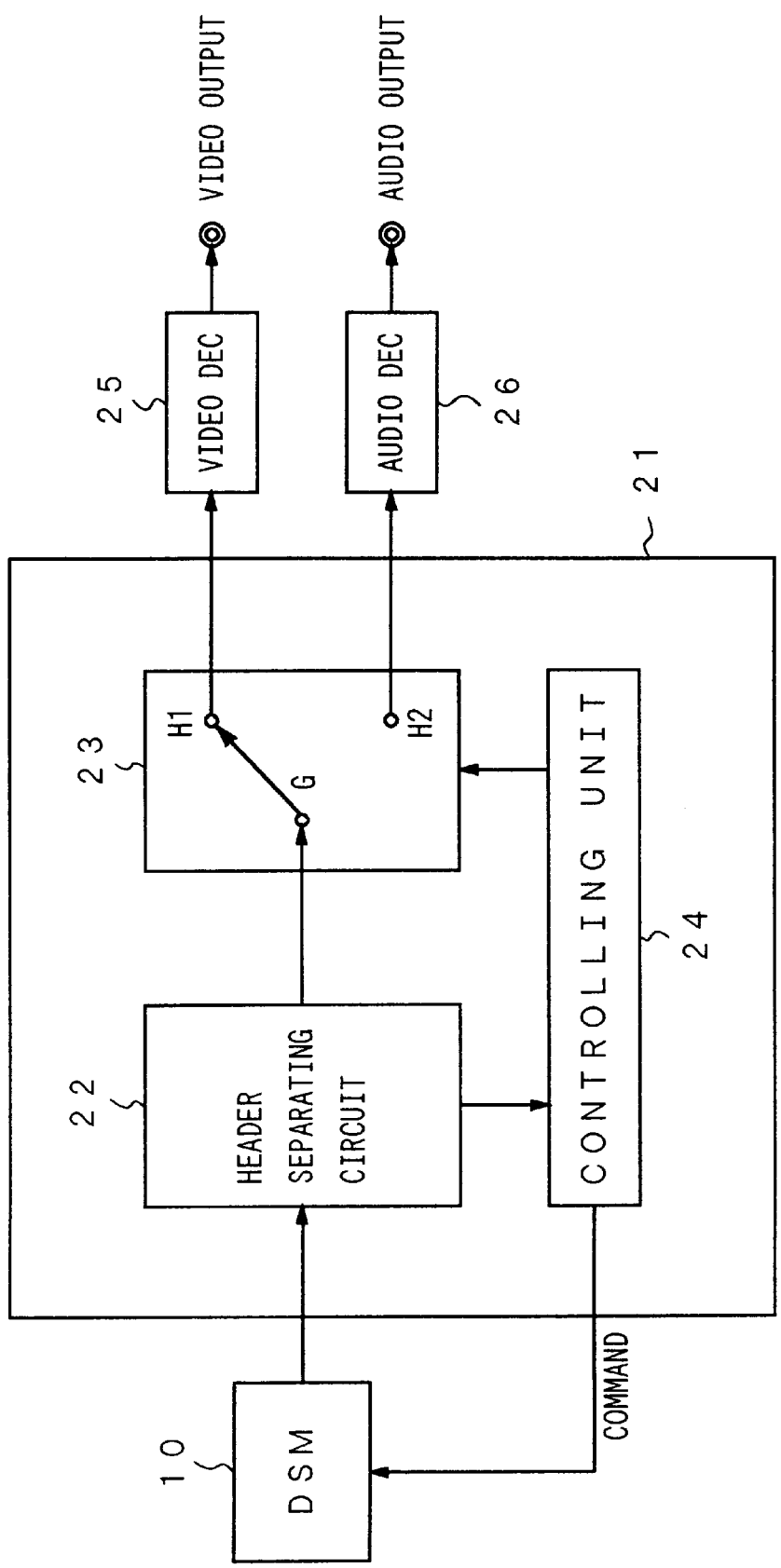
FIG. 2 is a block diagram showing an example of data decoding apparatus.
Figure 3:
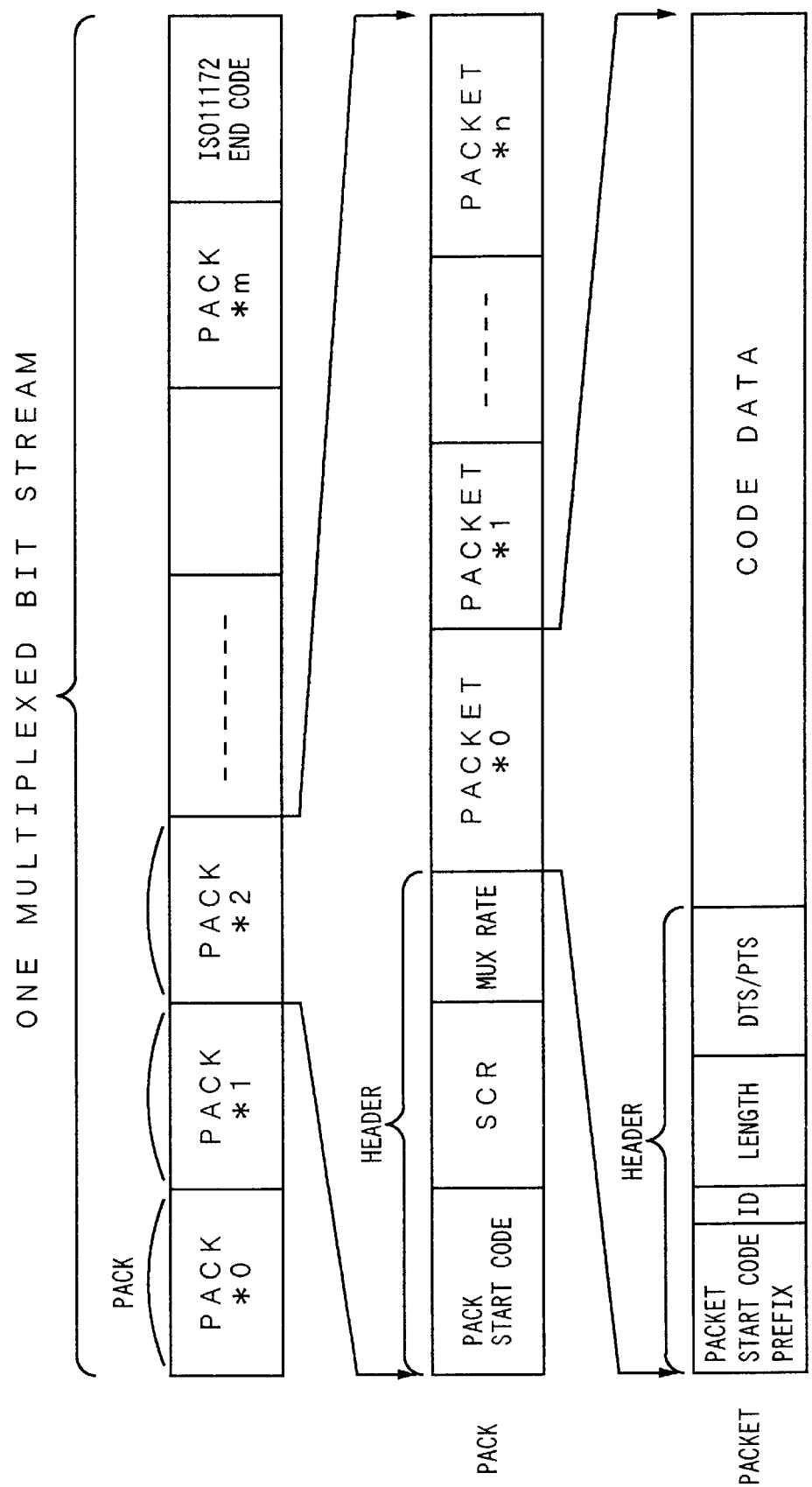
FIG. 3 is a schematic diagram explaining the format of a bit stream.
Figure 5:
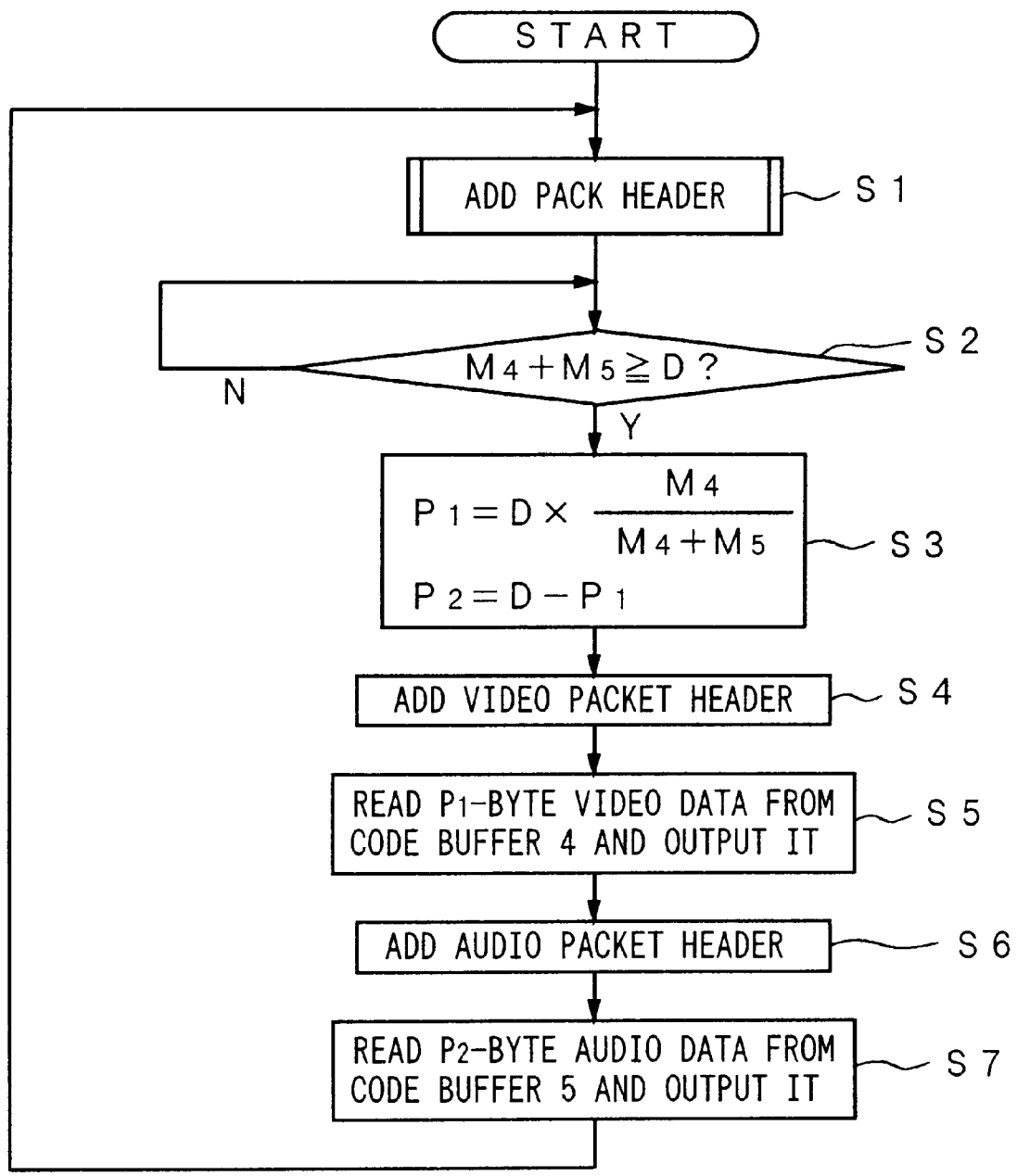
FIG. 5 is an operational flow chart.
Figure 6:
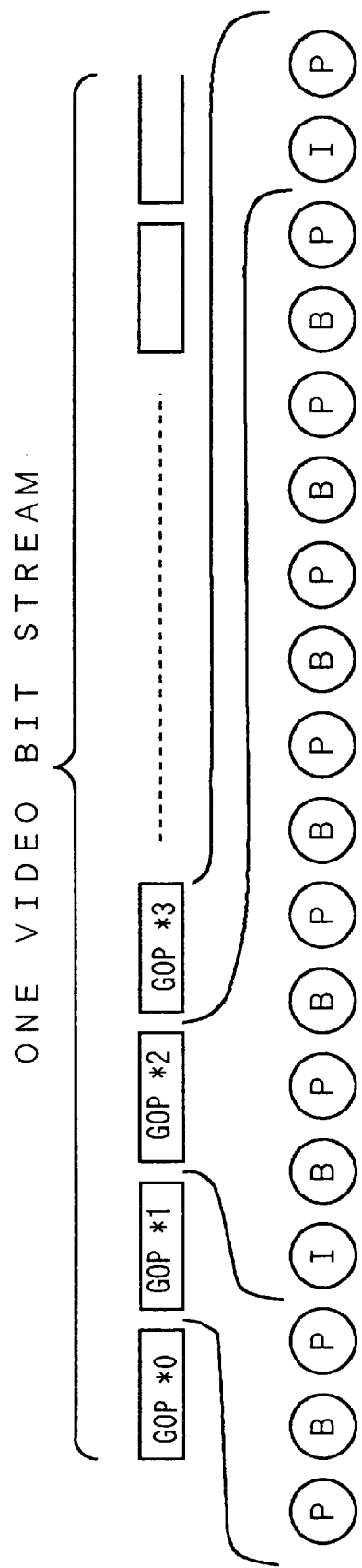
FIG. 6 is a schematic diagram explaining the bit stream on a disc of a DSM.
Figure 7:
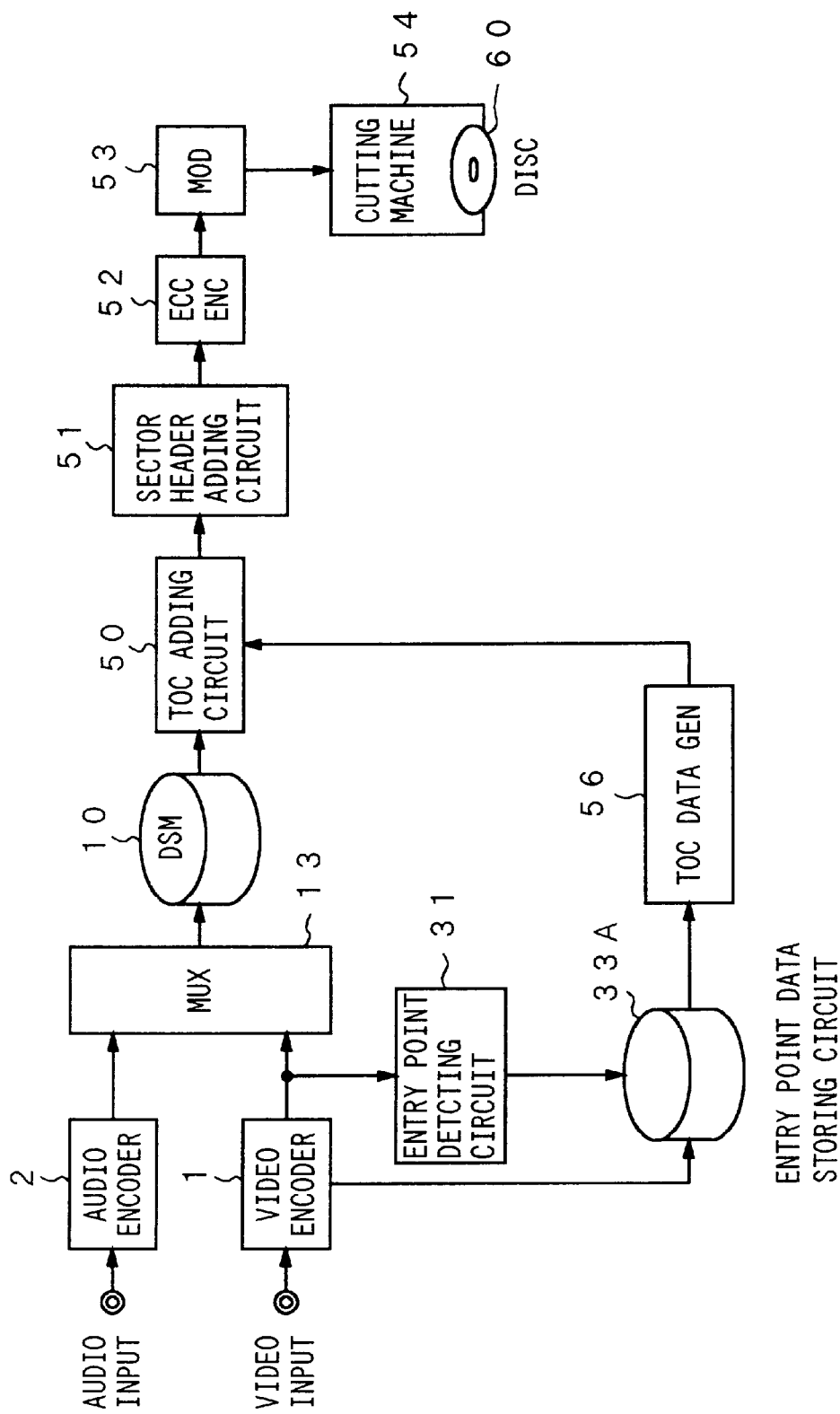
FIG. 7 is a block diagram showing another example of data encoding apparatus.
Figure 8:
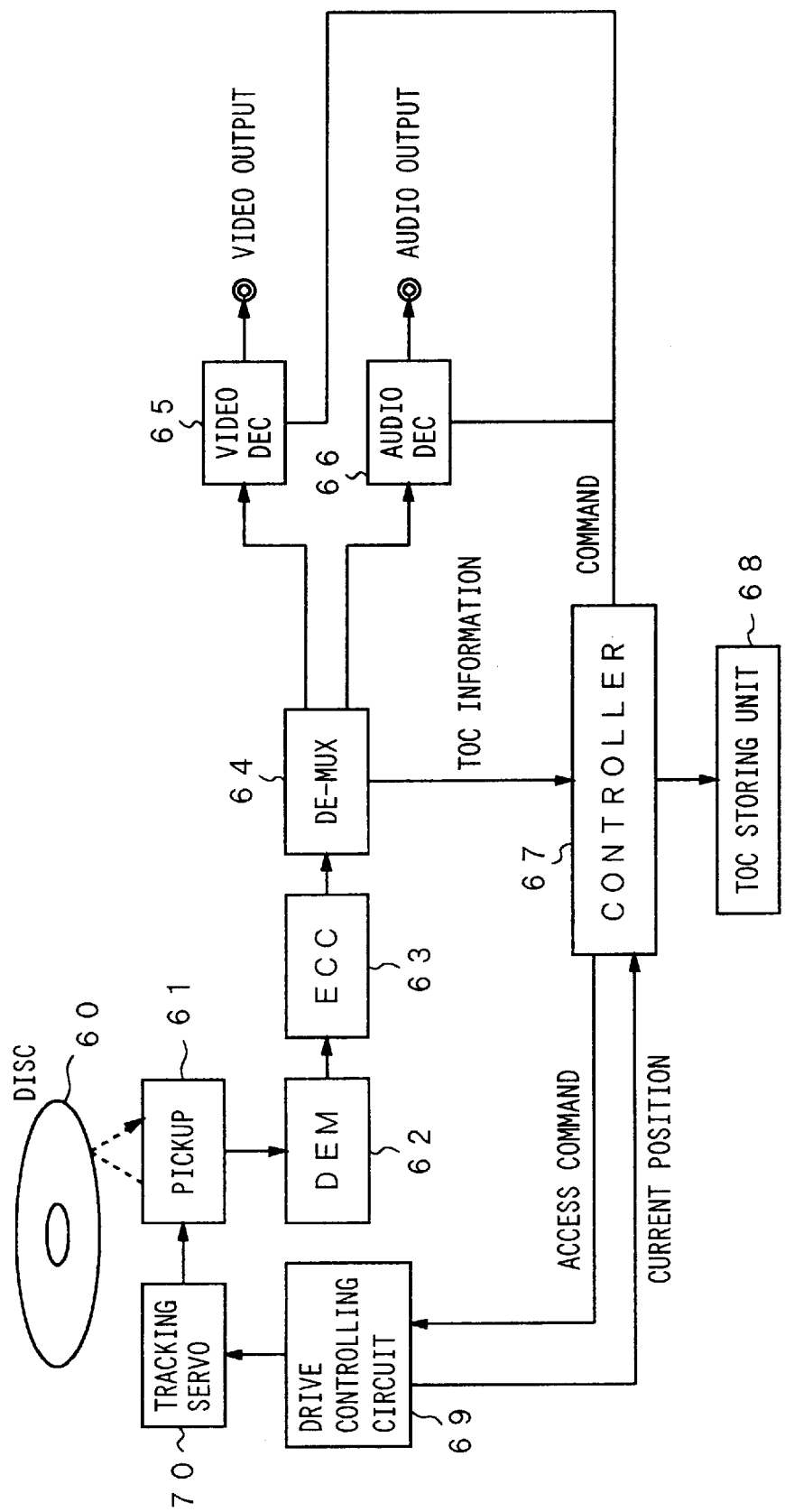
FIG. 8 is a block diagram showing another example of data decoding apparatus.
Figure 10:
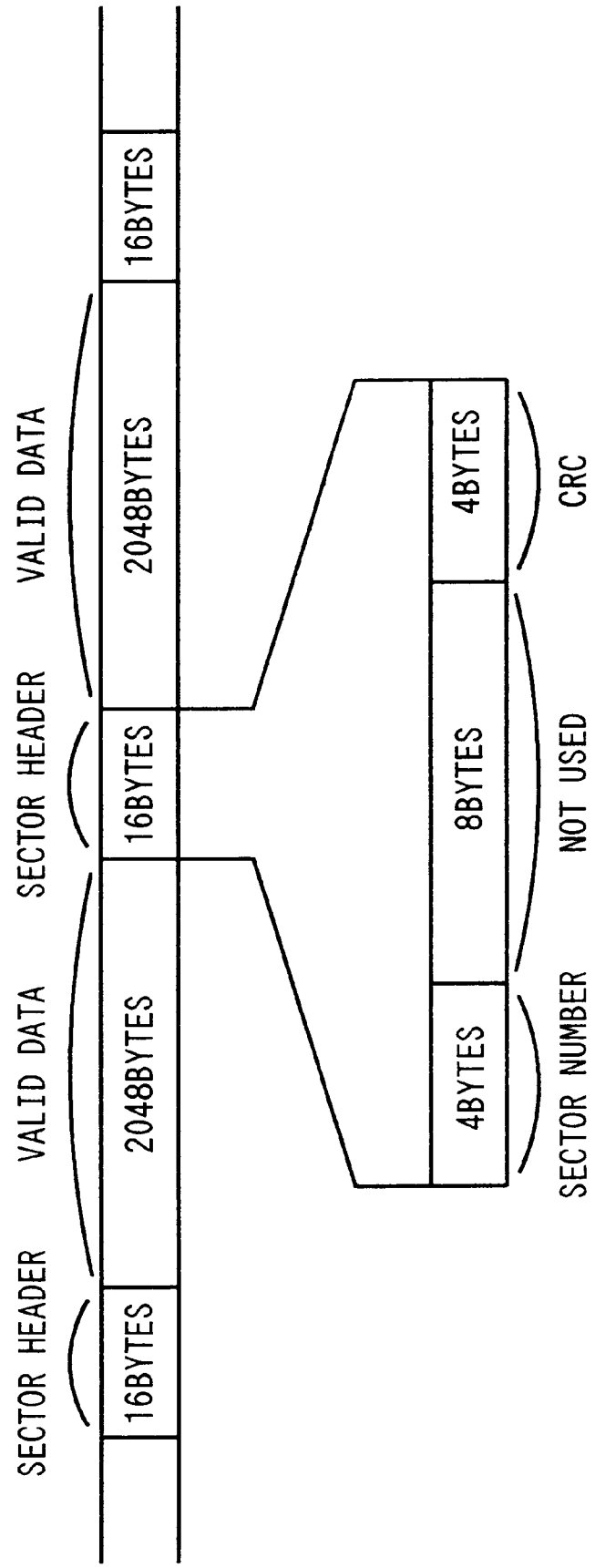
FIG. 10 is a schematic diagram explaining the structure of a sector.
Figure 11:
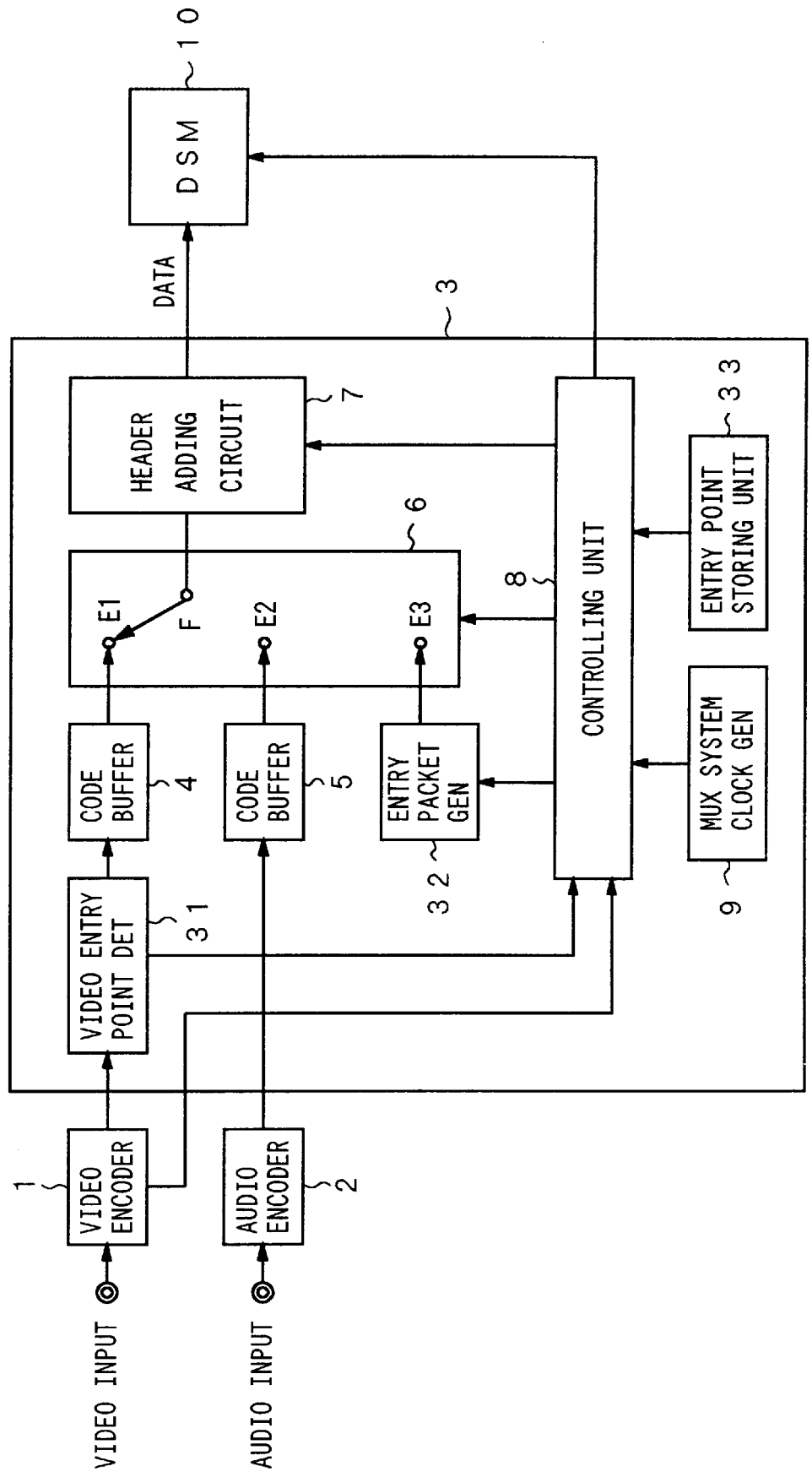
FIG. 11 is a block diagram showing data encoding apparatus.
Figure 12:
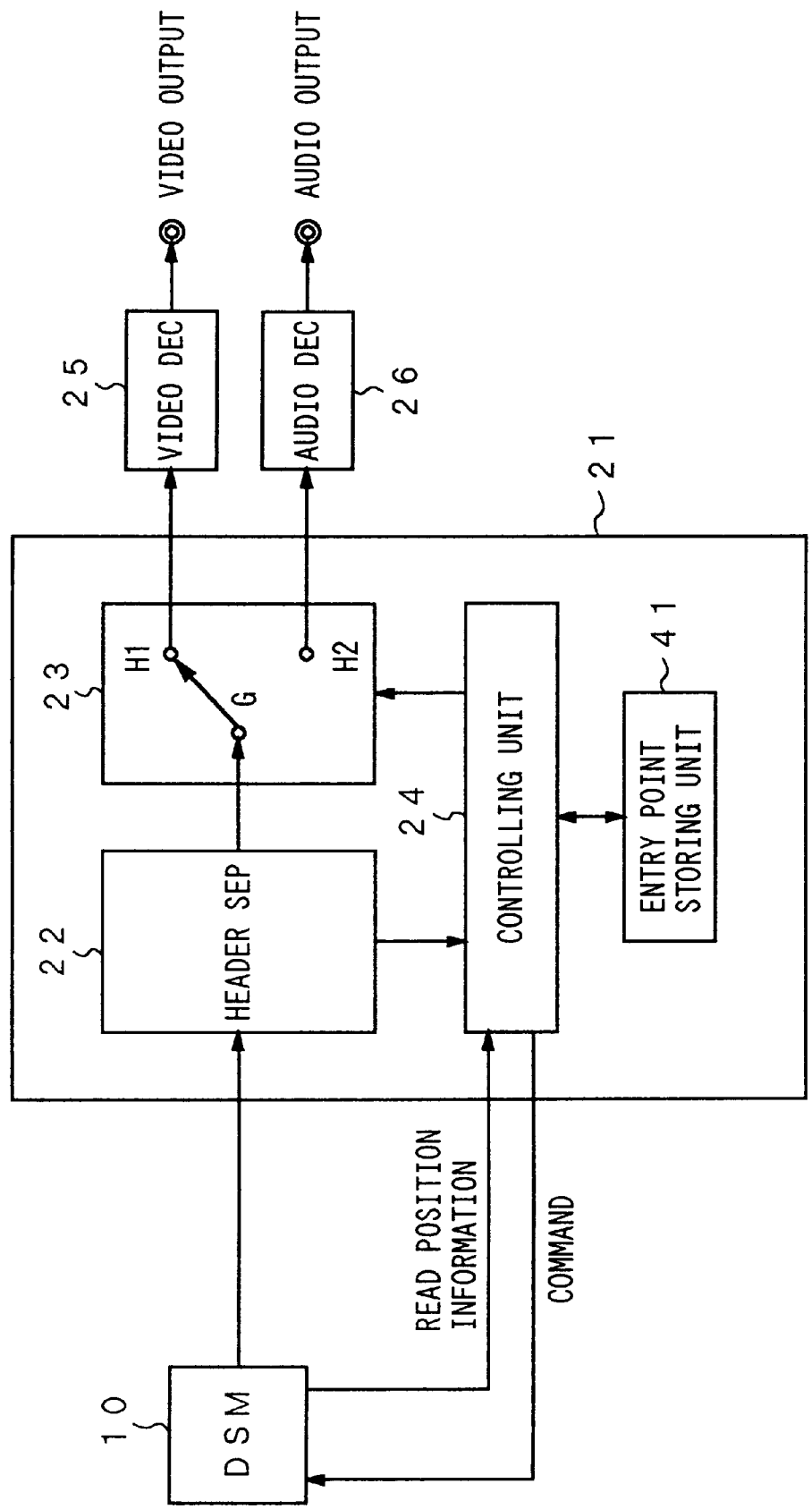
FIG. 12 is a block diagram showing data decoding apparatus.
Figure 13:
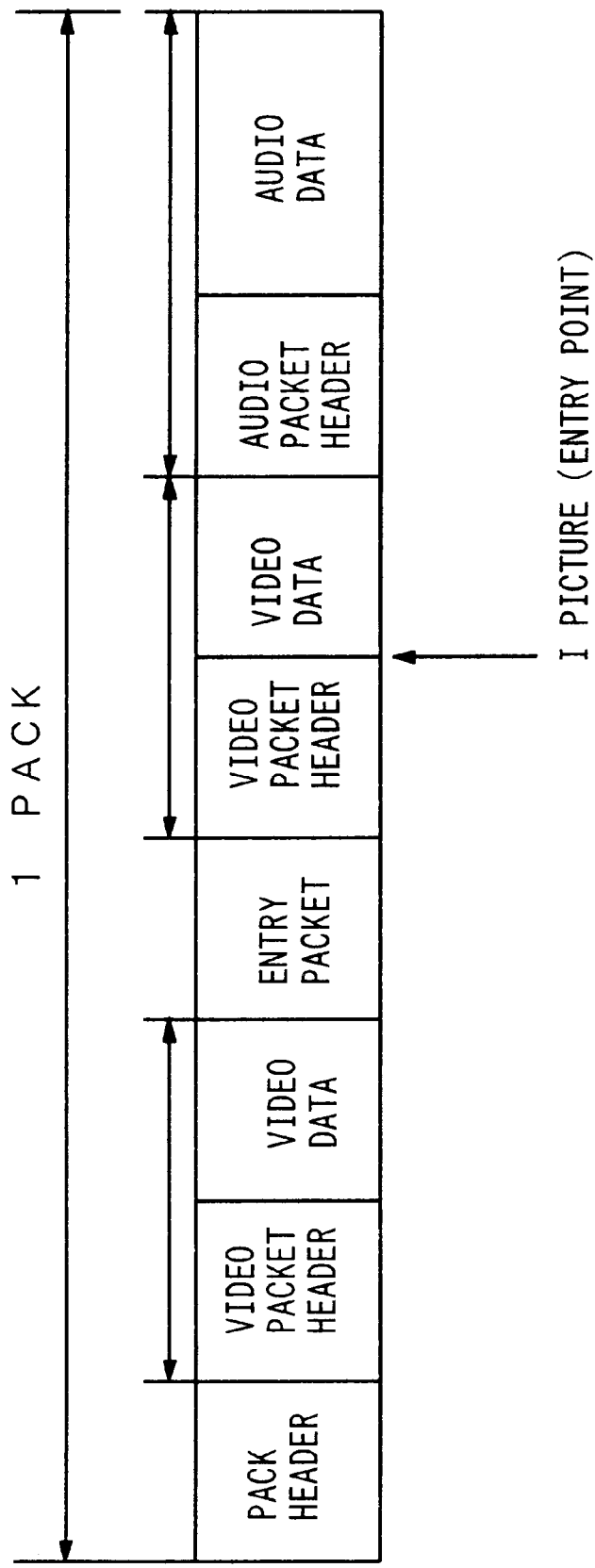
FIG. 13 is a schematic diagram showing the format of a pack of data on a disc of the DSM.
Figure 15:
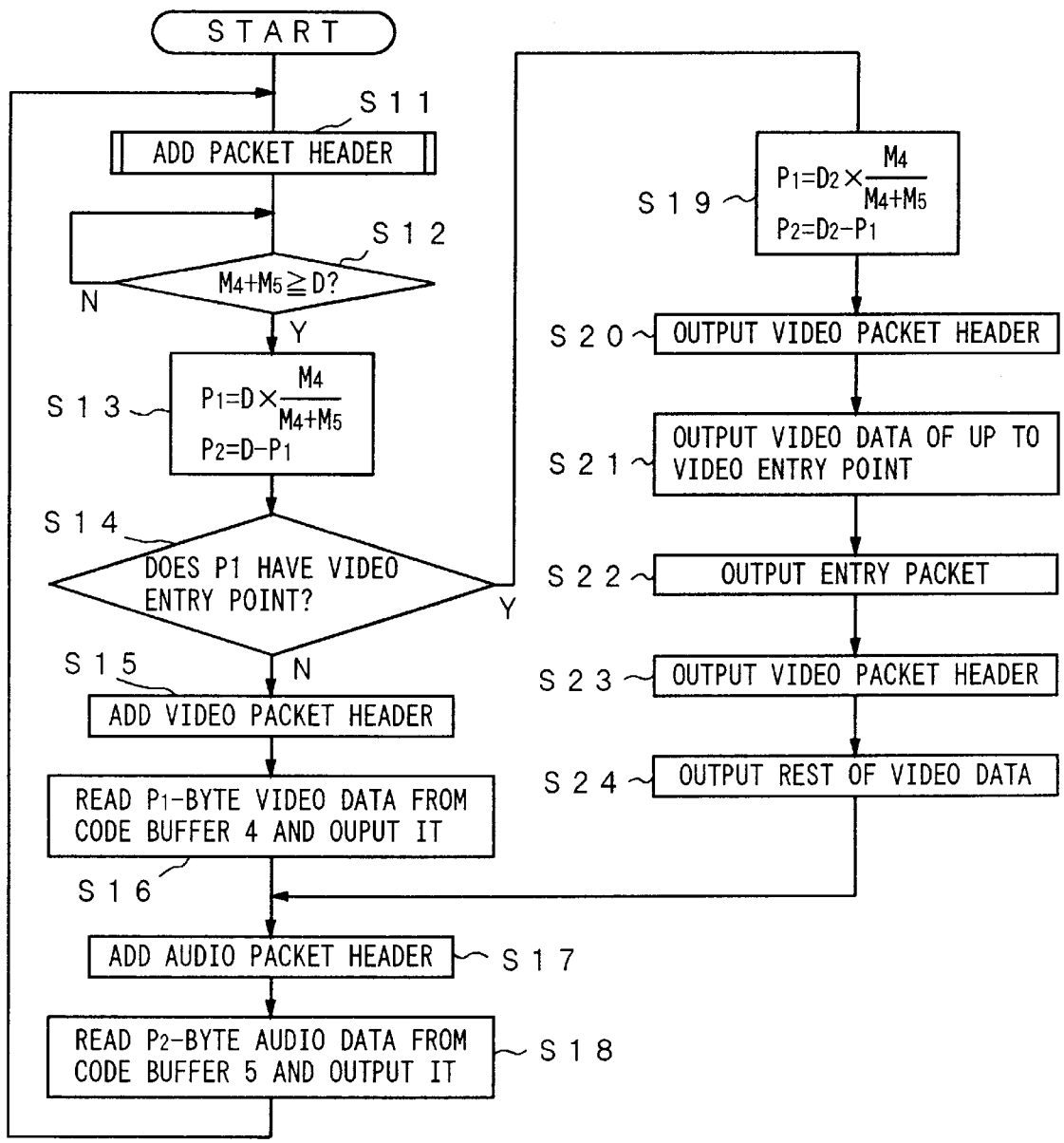
FIG. 15 is a flow chart explaining the operation of the data decoding apparatus of FIG. 12.
Figure 16:
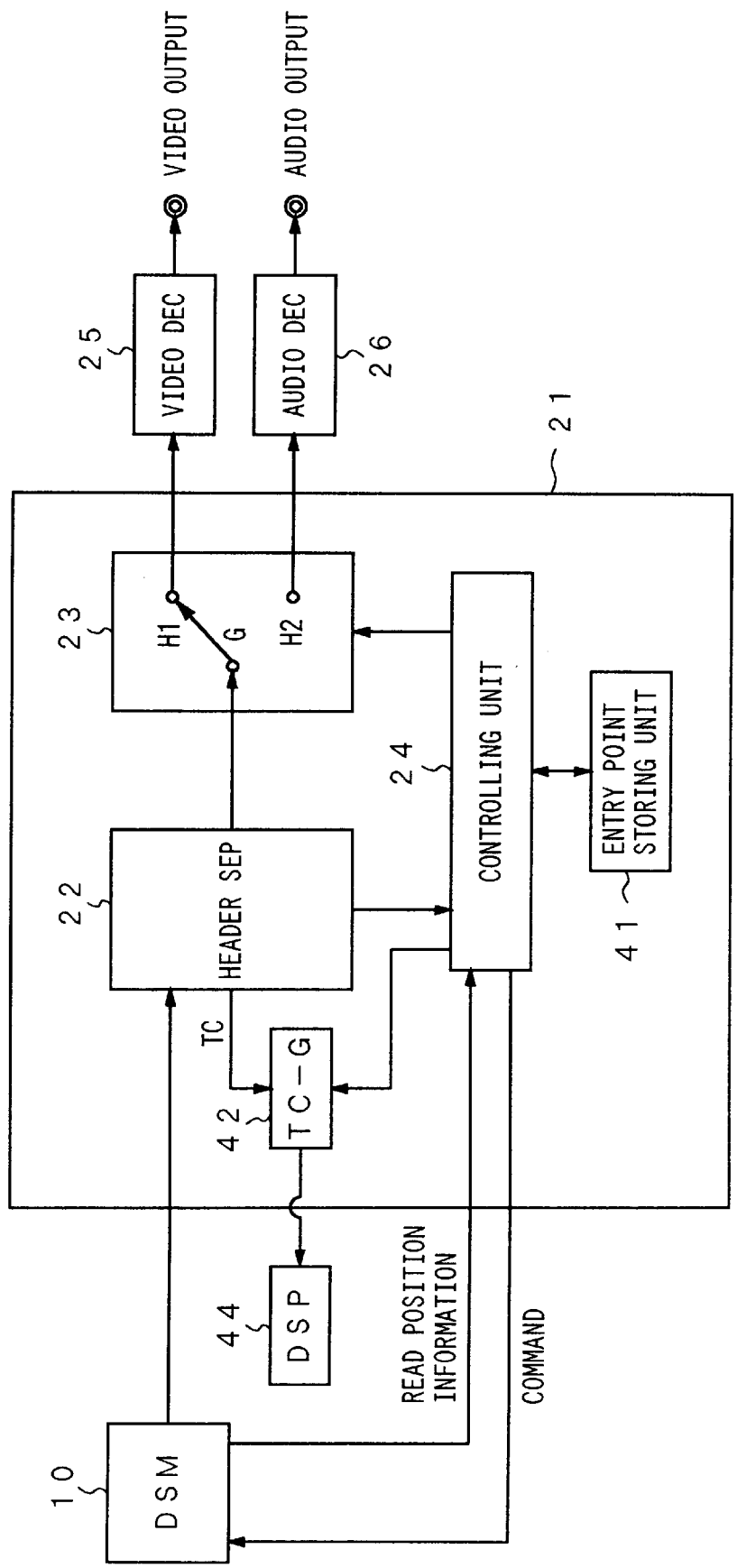
FIG. 16 is a block diagram showing an example of data decoding apparatus according to the present invention.

FIG. 16 shows decoding apparatus according to an embodiment of the present invention. For simplicity, elements shown in FIG. 16 corresponding to those shown in FIG. 12 are denoted by the same reference numerals and their description is omitted.

One feature of the present invention is the time code interpolating circuit 42 that interpolates time codes that are intermittently supplied thereto so as to generate successive time codes. The header separating circuit 22 separates a time code (TC) from a GOP header and supplies the separated time code to the time code interpolating circuit 42 which outputs the time code (TC) for a picture at the beginning of the GOP. For a picture not at the beginning of GOP, the time code interpolating circuit 42 outputs an incremented value (in the normal reproduction mode) or a decremented value (in the reverse reproduction mode) as an interpolated time code, thereby generating time codes for every picture in the GOP.

Figure 17:
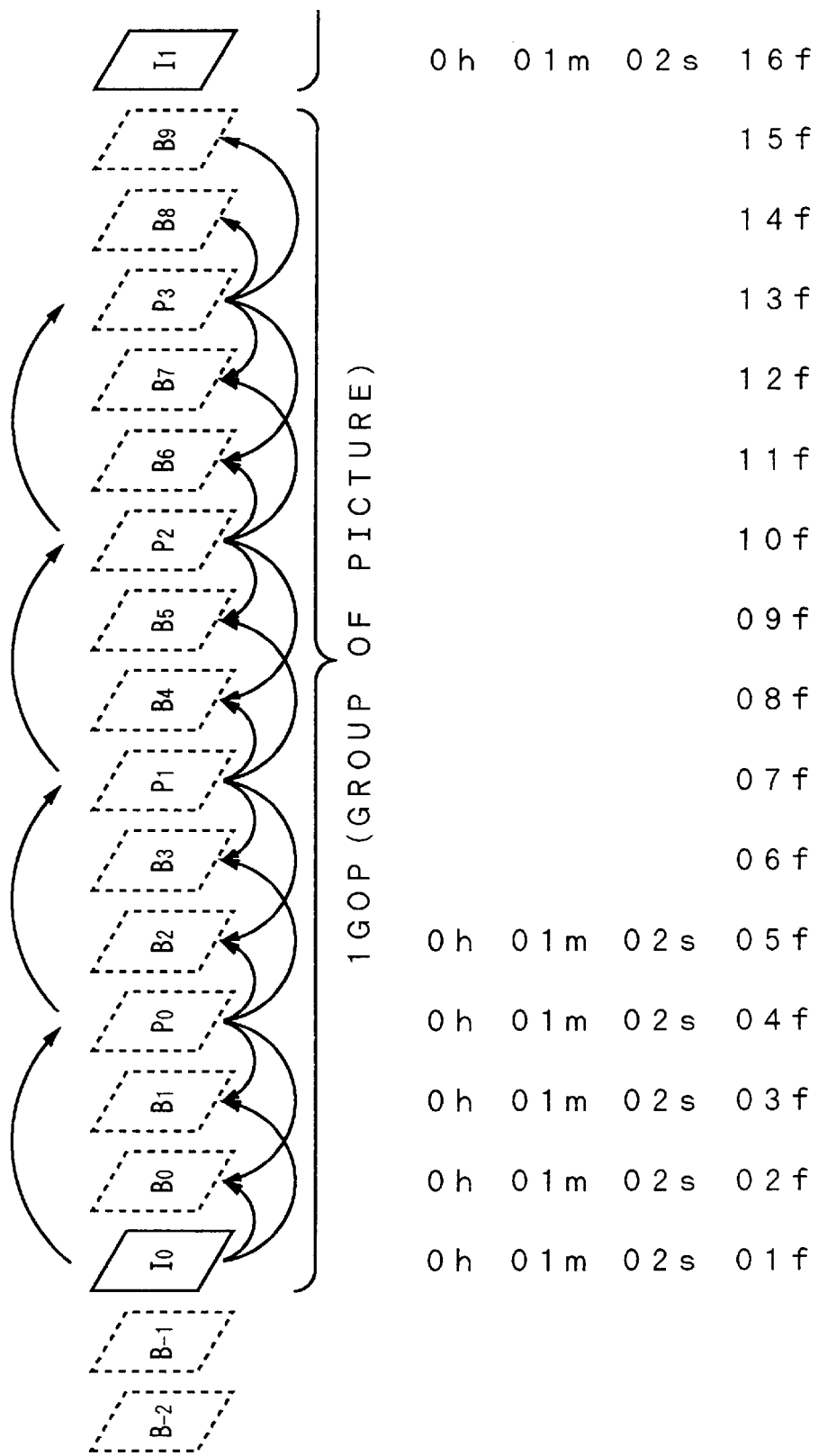
FIG. 17 is a schematic diagram explaining the operation of data decoding apparatus according to the present invention.

FIG. 17 shows the relation between the pictures in a GOP and the time codes in accordance with the present invention. For the first picture $I_0$ of a particular GOP, the time code (0h01m02s01f) that has been designated in the encoding process is obtained from the GOP header (where h represents hour, m represents minute, s represents second, and f represents frame). The next picture $B_0$ was not assigned a time code by the encoding process. Thus, the time code interpolating circuit 42 generates the interpolated time code (0h01m02s02f) for the picture $B_0$. In the same manner, the time code interpolating circuit 42 successively generates interpolated time codes for the remaining pictures belonging to the same GOP as picture $I_0$. Consequently, the time code interpolating circuit 42 eventually generates the time code (0h01m02s16f) which, it is appreciated, happens to be assigned to the picture $I_1$; and this same time code is read from the GOP header because $I_1$ is the first picture of the next GOP.

Figure 18:
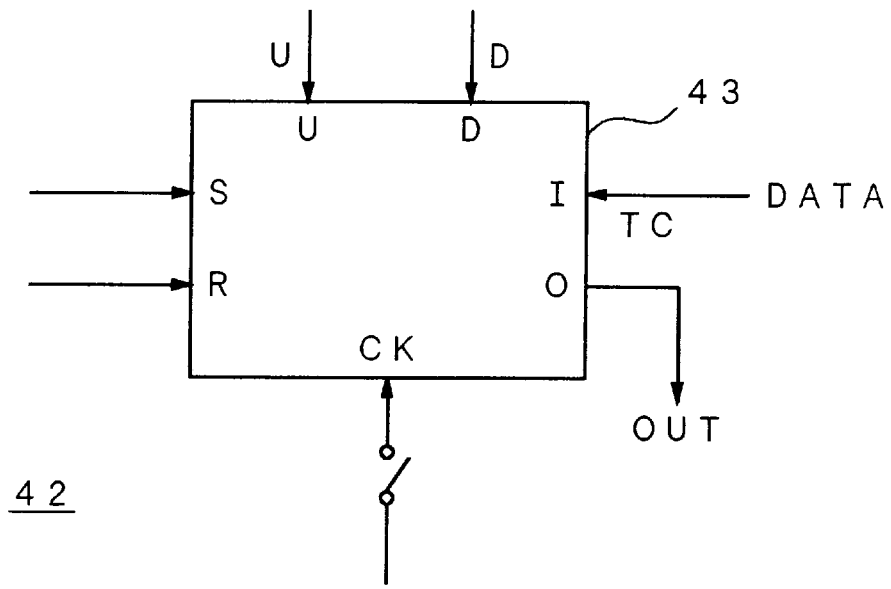
FIG. 18 is a block diagram of one embodiment of a timing code interpolating circuit used in data decoding apparatus according to the present invention.

FIG. 18 is a block diagram of the time code interpolating circuit 42 according to a first embodiment of the present invention. In describing this embodiment, the decoding apparatus performs either a normal reproducing operation or a reverse reproducing operation. A counter 43 is a clock counter that counts the hours, minutes, seconds, and frame numbers. When the header separating circuit 22 (FIG. 16) detects a GOP header, a flag is supplied to the set terminal (S) of the counter 43. The time code (TC) separated from the GOP header is supplied directly to the data input terminal (I) of the counter 43 so that the counter is set to the value of the separated time code.

The controlling unit 24 of FIG. 16 supplies a vertical synchronizing signal to the clock terminal (CK) of counter 43. Since the frequency of the normal vertical synchronizing signal is 60 Hz, this frequency preferably is divided into 30 Hz (the frame rate) by a simple frequency divider (not shown).

In the normal reproduction mode, the controlling unit 24 generates a flag which is supplied to the up terminal (U). In the reverse reproduction mode, the flag is supplied to the down terminal (D). When a disc is inserted into the apparatus, or when the pickup 61 is returned to its start position, the controlling unit 24 resets the counter 43 by supplying a signal to the reset terminal (R) of the counter. An output signal OUT supplied from an output terminal (O) of the counter 43 is displayed by a displaying circuit 44.

In the normal reproduction mode and also in the reverse reproduction mode, a precise time code is displayed for each GOP. The counter 43 increments the frame number every 1/30 seconds in response to the synchronizing signal supplied to clock terminal CK, and the current counter reading for each frame not assigned a time code by the encoding process is displayed. Thus, time codes are successively displayed for each individual frame in the GOP whether or not a time code was initially assigned to that frame by the encoding process.

In this embodiment, since the vertical synchronizing signal is used as the clock, only the first frame of the GOP need be precisely measured. However, since a GOP is composed of 15 frames in the MPEG system, two time codes can be precisely displayed per second. Thus, the aforenoted practical problem is eliminated when the MPEG format is used.

Figure 19:
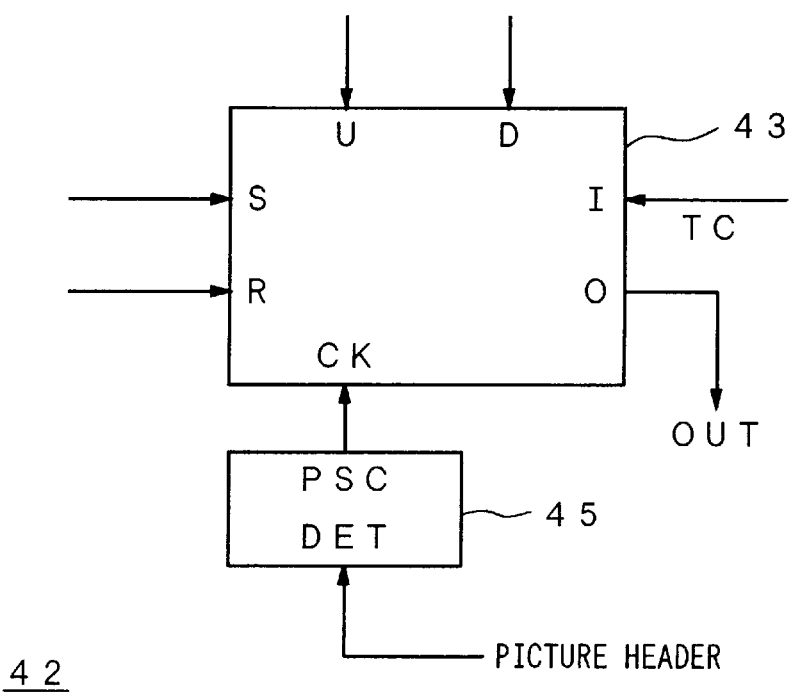
FIG. 19 is a block diagram of another embodiment of a timing code interpolating circuit used in data decoding apparatus according to the present invention.

FIG. 19 is a block diagram of another embodiment of the time code interpolating circuit 42. In this embodiment, a picture start code (PSC) included in a picture header is detected and used as a clock signal. A picture start code detector 45 detects the picture start code and generates a pulse that is supplied to clock terminal CK to increment or decrement the counter 43. For a variable speed reproduction mode, the time codes can nevertheless be displayed so long as the picture header can be detected.

Figure 20:
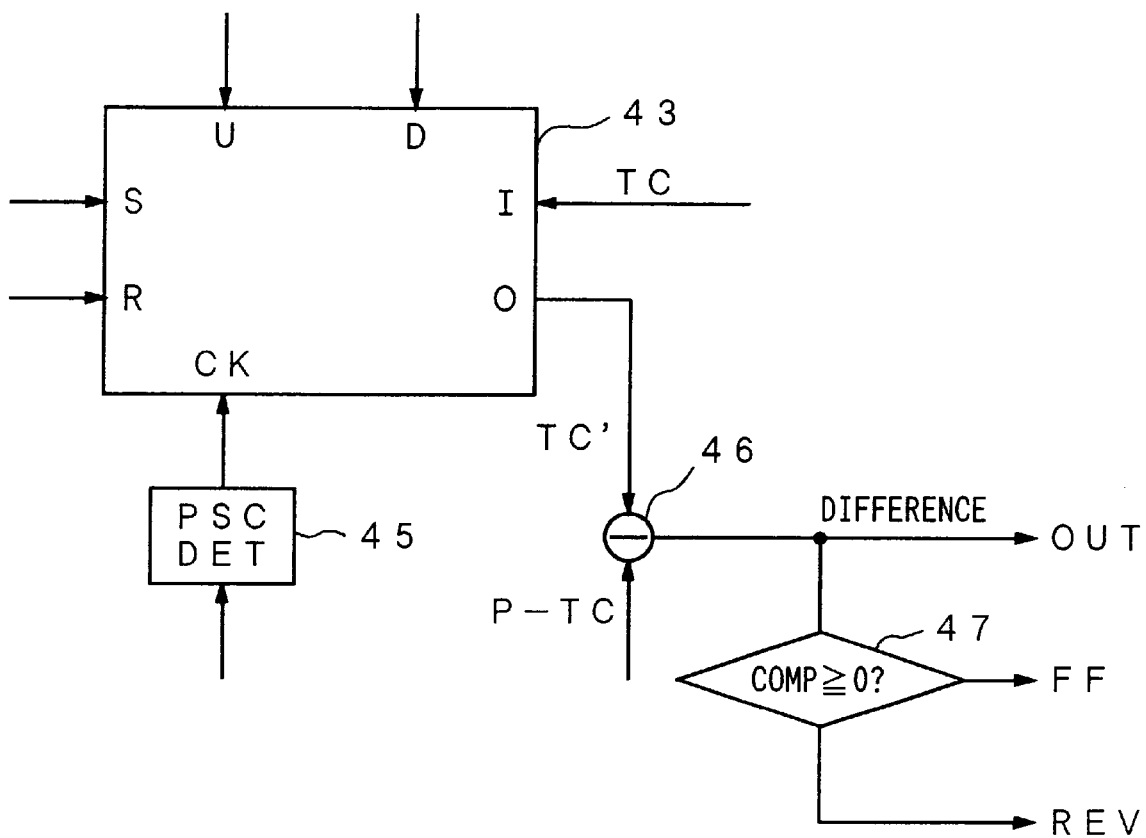
FIG. 20 is a block diagram of a further embodiment of a timing code interpolating circuit used in data decoding apparatus according to the present invention.

FIG. 20 shows another embodiment of the time code interpolating circuit 42. Instead of performing the search operation based on the input time codes as in the previous embodiment, the difference between the input time code (P-TC) and the current time code (TC') generated by counter 43 is used. A subtracter 46 determines and outputs the difference between the input time code and the current time code. The difference is visibly displayed by the displaying circuit 44 and a comparator 47 compares the difference with 0.

When the difference is positive, the controlling unit 24 issues a command to access the data in the fast forward (FF) direction. But, when the difference is negative, the data is accessed in the reverse (REV) direction. The furthest entry point is accessed when the difference is large; the nearest entry point is accessed when the difference is small. Since three entry points in the forward direction and three entry points in the reverse direction are in each entry packet, searching in three or more levels can be used as a combination of selected entry points. Alternatively, searching without levels may be used based simply on the time code difference.

Figure 22:
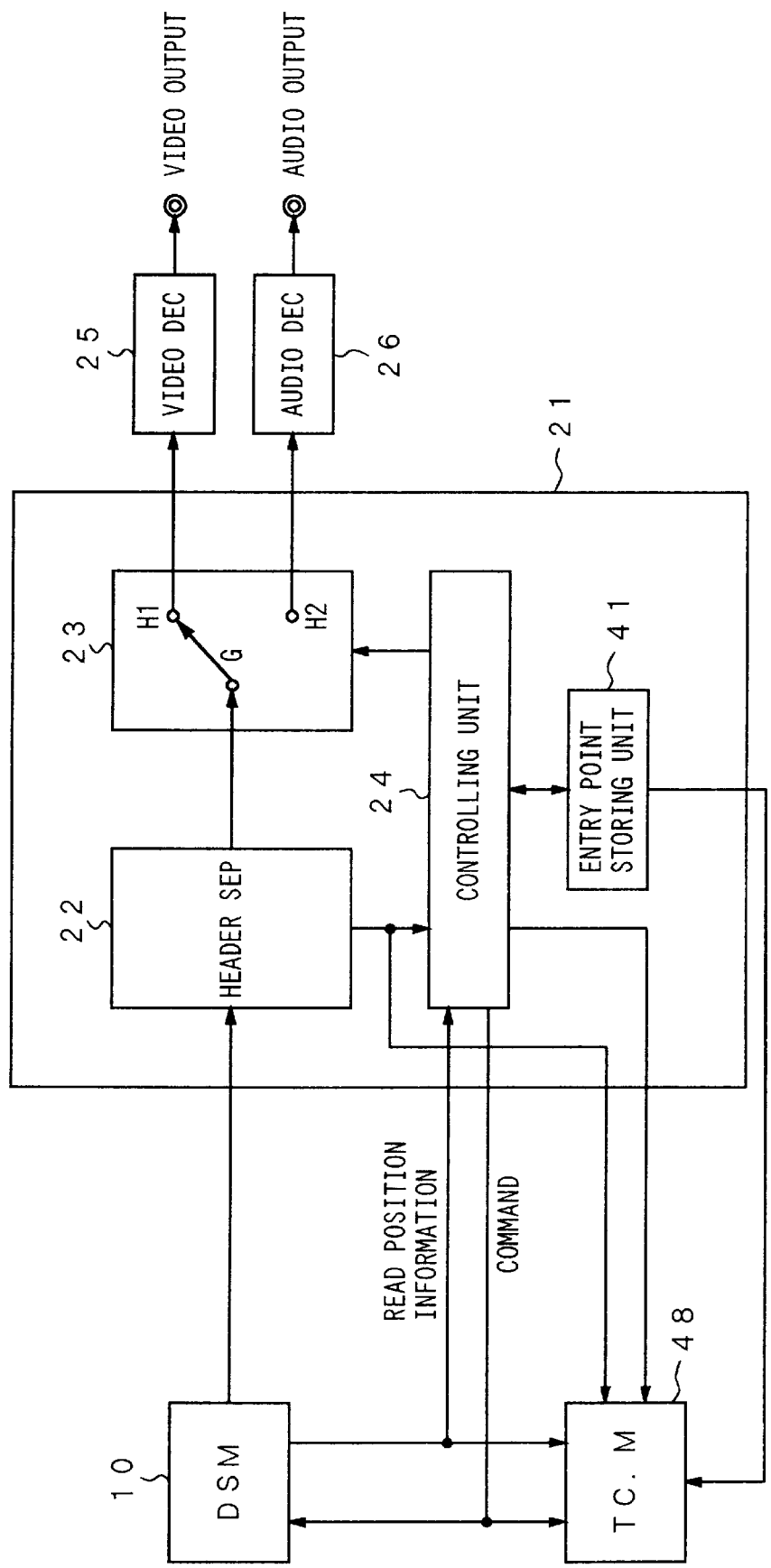
FIG. 22 is a block diagram of another embodiment of data decoding apparatus according to the present invention.

FIG. 21 illustrates a TOC table recorded on a disc. It is recalled from FIG. 9 that TOC has a sector address corresponding to an entry point. In FIG. 21, however, the TOC has both a sector address and a time code (TC) corresponding to an entry point thus forming a time code table. When a disc has the TOC shown in FIG. 21 recorded thereon, the decoding apparatus shown in FIG. 22 can search data at a high speed corresponding to the time codes.

Figure 23:
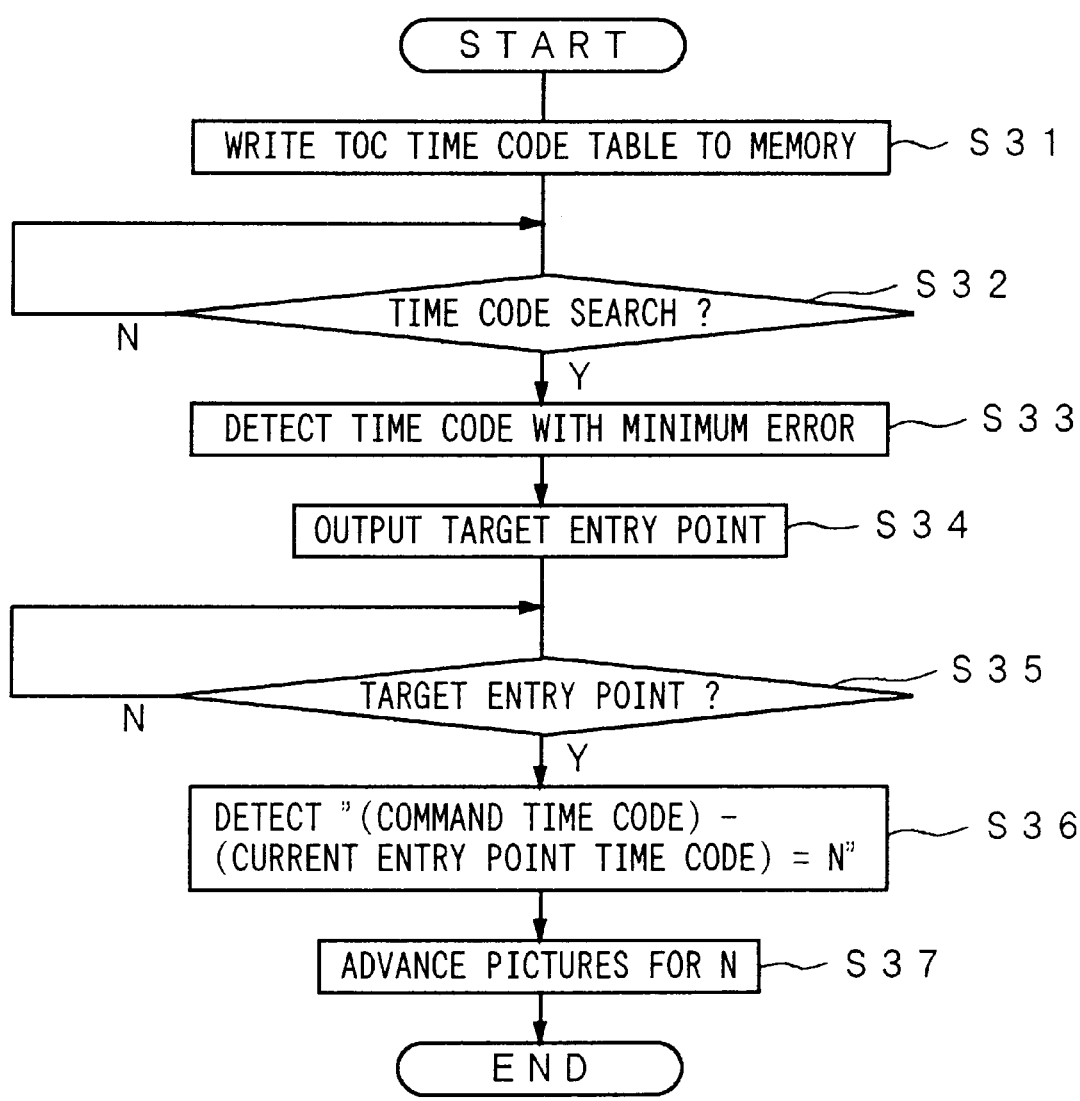
FIG. 23 is a flow chart explaining the operation of the data decoding apparatus of FIG. 22.

A time code manager 48 manages the TOC time code table, the current time code, and a command time code by executing the routine shown in FIG. 23. When data on the disc initially is reproduced, the TOC time code table is stored in a memory of the time code manager 48 at step S31. When a time code search command is issued at step S32, the time code manager 48 causes the controlling unit 24, the video decoder 25, and the audio decoder 26 to enter a time code search mode. The time code manager compares the command time code with each time code in the time code table and detects the time code which minimizes the error, or distance from the desired position, at step S33. When the time code manager 48 finds the time code which minimizes this error, it outputs the entry point from the time code table as a target entry point at step S34. The controlling unit 24 determines the accessing direction of the pickup based on the current read position and the target entry point, whereby the pickup searches for a sector of the target entry point.

When the pickup finds the target sector at step S35, it moves to the entry point of the sector and returns the time code corresponding to that entry point to the time code manager 48. Since the command time code does not accord with the time code of the entry point, the time code manager 48 detects (at step S36) the difference in terms of number of frames and, as represented by step S37, controls the displacement of the read position depending on the difference.

A frame that accords with the command time code is not always an I picture. Thus, when the detected frame is a P picture, the frame that precedes the detected frame is also read. When the detected frame is a B picture, the frames that precede and follow the detected frame are also read. Unless the frame that precedes the detected frame for a P picture or the frames that precede and follow the detected frame for a B picture are read, the detected frame cannot be MPEG decoded. In MPEG, the P/B pictures are identified by the picture type (Picture Coding Type: PCT) included in the picture header.

In the above-described embodiments, time codes recorded in the GOP header are extracted and used to generate successive time codes. When time codes are added to the private_stream_type_1, the private_stream_type_2, the program stream map, and the program stream directory defined in ISO 11172-1 (MPEG1 SYSTEM) and ISO 13818-1 (MPEG2 SYSTEM), the same results are obtained as with the above-described embodiments.

Since the time code interpolating circuit 42 according to the present invention adds the time codes to those pictures that were not initially assigned with time codes, pictures are accessed at a high speed based on the time interpolated codes; and the time codes corresponding to the desired pictures are successively displayed.

Although illustrative embodiments of the present invention, and various modifications thereof, have been described in detail herein with reference to the accompanying drawings, it is to be understood that the invention is not limited to these precise embodiments and described modifications, and that various changes and further modifications may be effected therein by one skilled in the art without departing from the scope and spirit of the invention as defined in the appended claims.

What is claimed is:

1. Data decoding apparatus for decoding a data bit stream which includes picture data bits representing pictures and into which time codes have been intermittently inserted and assigned to predetermined pictures, comprising:

an extractor for extracting said inserted time codes from said data bit stream;

an interpolator responsive to said extracted time codes for interpolating successive time codes for those pictures in said data bit stream to which time codes have not been assigned; and a display device for displaying said successive time codes.

2. The apparatus of claim 1, wherein said predetermined pictures are particular pictures in a Group of Pictures (GOP); and said interpolator comprises a counter presettable with a time code included in a header of said GOP as a set signal and responsive to a clock signal synchronized with each picture for counting said clock signal in a forward direction in response to an up flag and in a reverse direction in response to a down flag.

3. The apparatus of claim 1, wherein said data bit stream is received from a digital recording medium on which are recorded a sector area for storing data and table of content data (TOC) for enabling efficient access by sector address to data stored on said digital recording medium, said TOC data contains sector addresses of said predetermined pictures as well as said time codes corresponding to said sector addresses; and wherein said apparatus further comprises an input device for inputting a time code, a detector for detecting the sector address corresponding to a time code closest in value to said inputted time code, and a search device for searching said digital recording medium for said corresponding sector address.

4. The apparatus of claim 3, wherein said digital recording medium is a magneto-optic disc.

5. The apparatus of claim 3, wherein said digital recording medium is a magnetic disc.

6. A data decoding method for decoding a data bit stream which includes picture data bits representing pictures and into which time codes have been intermittently inserted and assigned to predetermined pictures, comprising the steps of:

extracting said inserted time codes from said data bit stream;

interpolating successive time codes from said extracted time codes; and adding said successive time codes to those pictures in said data bit stream to which time codes have not been assigned.

7. The method of claim 6, wherein a target picture is decoded by generating a target time code corresponding to said target picture, comparing said target time code to said successive time codes until said target time code is equal to a successive time code, and accessing and decoding a picture corresponding to said target time code.

* * * * *